United States Patent [19]

Murai et al.

[11] Patent Number: 4,931,951

[45] Date of Patent: Jun. 5, 1990

[54] METHOD FOR GENERATING RULES FOR AN EXPERT SYSTEM FOR USE IN CONTROLLING A PLANT

[75] Inventors: Ryuichi Murai; Kenzo Kobayashi, both of Kamakura, Japan

[73] Assignee: Mitsubishi Denki Kabushiki Kaisha, Tokyo, Japan

[21] Appl. No.: 190,060

[22] Filed: May 4, 1988

[30] Foreign Application Priority Data

May 8, 1987 [JP] Japan ................. 62-111864
May 8, 1987 [JP] Japan ................. 62-111865
Oct. 15, 1987 [JP] Japan ................. 62-260408

[51] Int. Cl.⁵ ............................... G06F 15/18
[52] U.S. Cl. ........................ 364/513; 364/200; 364/274.5; 364/300; 364/900; 364/972.3
[58] Field of Search ........ 364/513, 300, 900 MS File, 364/200 MS File

[56] References Cited

U.S. PATENT DOCUMENTS 4,591,983 5/1986 Bennett et al. ............... 364/900 X
4,648,044 3/1987 Hardy et al. .................. 364/900 X
4,670,848 6/1987 Schramm .................... 364/513

OTHER PUBLICATIONS

On the Prediction of Phenomena from Qualitative Data and the Quanitification of Qualitative Data from the Mathematico-Statistical Point of View, Annals of the Institute of Statistical Mathematics, vol. 3, pp. 69-98, 152, Author Chikio Hayashi; 1952.

Primary Examiner—Joseph Ruggiero
Attorney, Agent, or Firm—Wolf, Greenfield & Sacks

[57] ABSTRACT

A method for generating rules for an expert system for use in controlling operation of a plant is provided. In this method, an analysis by Quantification Theory I or II is made on operating data offered by an operator in a plant, whereby the relationship between the operator's manipulated value of operating data and the operator's controlled value of operating data is analyzed. The results of the analysis are then integrated to generate a rule for controlling operation of the plant.

13 Claims, 14 Drawing Sheets

Fig. 5

IF
  DATA ON "ITEM" 1 BELONGS TO "CATEGORY" K1;
  DATA ON "ITEM" 2 BELONGS TO "CATEGORY" K2;
  ----
THEN
  (OUTPUT) = ("Y-INTERCEPT")
    +("ITEM" 1, "SCORE" OF "CATEGORY" K1)
    +("ITEM" 2, "SCORE" OF "CATEGORY" K2)
    +("ITEM" 1 * 2, "SCORE" OF "CATEGORY" K1 * K2)

Fig. 8

IF ("score") = ("SCORE" OF "CATEGORY" 1)
+ ("SCORE" OF "CATEGORY" 2)
⋮
+ ("SCORE" OF "CATEGORY" N);

AND $\alpha_{M-1} \leqq$ ("score") < $\alpha_M$,

THEN CARRY OUT OPERATION OF "GROUP" M

Fig. 11

| | | | | | | |
|---|---|---|---|---|---|---|
| 1 | | 800 | 21.9 | 742.8 | 340.1 | 449.4 } "PAGE" 1 |
| ... | | | | | | |
| 50 | 50 | 901 | 26.7 | 750.3 | 290.3 | 440.1 |
| 51 | 51 | 902 | 27.2 | 746.3 | 328.1 | 439.8 } "PAGE" 2 |
| ... | | | | | | |
| 100 | 550 | 1927 | 25.3 | 747.3 | 386.5 | 440.5 |
| 101 | 554 | 1928 | 25.9 | 747.8 | 346.7 | 440.4 } "PAGE" 3 |
| ... | | | | | | |
| 150 | 899 | 243 | 25.3 | 749.3 | 297.6 | 432.5 |
| 151 | 900 | 244 | 25.3 | 751.3 | 339.0 | 432.4 } "PAGE" 4 |
| ... | | | | | | |
| 200 | 1051 | 553 | 24.1 | 747.6 | 364.5 | 421.2 |
| 201 | 1052 | 555 | 23.5 | 747.1 | 277.1 | 421.4 } "PAGE" 5 |
| ... | | | | | | |
| 221 | 424 | 1649 | 24.9 | 747.1 | 326.4 | 437.9 |

Fig. 12
DATA LIST

| | | | | | | | | | | |
|---|---|---|---|---|---|---|---|---|---|---|
| 2 | PR | 1 | 214 | 10 | | | | | | |
| 3 | Item a11 | Item a21 | Item a31 | Item b11 | Item b21 | Item b31 | Item c11 | Item c21 | Item c31 | |
| 4 | 12X, | 311, 2X, | 311, 2X, | 311, 2X, F5, 11 | | | | | | |
| 5 | 2 | 801 | 100 | 100 | 100 | 0.5 | | | | |
| 6~ | | | | | | | | | | |
| 48 | 44 | 854 | 001 | 001 | 001 | −0.4 | | | | |
| 49 | 45 | 855 | 010 | 010 | 001 | −0.4 | | | | |
| 104 | 552 | 1929 | 100 | 010 | 001 | 0.0 | | | | |
| 105 | 553 | 1930 | 010 | 100 | 100 | −0.2 | | | | |
| 160 | 909 | 256 | 001 | 001 | 001 | −0.4 | | | | |
| 161 | 910 | 257 | 001 | 001 | 010 | −0.4 | | | | |
| 216 | 421 | 1645 | 100 | 001 | 010 | 0.0 | | | | |
| 220 | RD 02 | 10030010407 | | | | | | | | |

QUANTIFICATION THEORY I

Fig. 13

|  |  | Category | Score |  |
|---|---|---|---|---|
|  |  | Intercept | Value | 0.13183 |
| No. | Variable | Item |  | Category Score |
| 1 | Item | a 1 |  | 0.00000 |
| 2 | Item | a 2 |  | -0.25151 |
| 3 | Item | a 3 |  | -0.51049 |
| 4 | Item | b 1 |  | 0.00000 |
| 5 | Item | b 2 |  | -0.04770 |
| 6 | Item | b 3 |  | -0.07923 |
| 7 | Item | c 1 |  | 0.00000 |
| 8 | Item | c 2 |  | -0.01704 |
| 9 | Item | c 3 |  | -0.04532 |

Fig. 14

| Measurement No. | Measured Value of Y | Estimated Value of Y | Error | Measured Value/ Estimated Value |
|---|---|---|---|---|
| 1 | 0.5000 | 0.13318 | 0.36817 | 73.63354 |
| ⋮ | | | | |
| 43 | -0.4000 | -0.47277 | 0.07267 | -18.16801 |
| 45 | -0.4000 | -0.60422 | 0.10420 | -26.05040 |
| ⋮ | | | | |
| 100 | -0.2000 | -0.11977 | -0.08032 | 40.16026 |
| 101 | -0.1000 | -0.16660 | -0.06660 | -65.99644 |
| ⋮ | | | | |
| 156 | -0.4000 | -0.47488 | 0.07493 | -18.73164 |
| 157 | -0.5000 | -0.47479 | -0.02507 | 5.01468 |
| ⋮ | | | | |
| 214 | 0.0000 | 0.11148 | -0.11479 | ---- |

Error Range ---- 1.295

Error Range / Mean Error of Estimated Values ---- 8.735

Analysis

| Item | Range |
|---|---|
| 1 | 0.51049 |
| 2 | 0.07923 |
| 3 | 0.04632 | ns
METHOD FOR GENERATING RULES FOR AN EXPERT SYSTEM FOR USE IN CONTROLLING A PLANT

BACKGROUND OF THE INVENTION

1. Field of the Invention

The present invention relates to a method for generating rules for an expert system which is for use in controlling operation of a plant in order to, for example, achieve optimum production in a plant.

2. Description of the Prior Art

Recently, in the technical field of plant engineering, practical expert systems for use in a plant control system have been developed as application of the fruit of artificial intelligence research. Especially, for expert systems of a type of using a set of rules as knowledge representation (namely, what is called rule-based systems), it is very important how optimum rules for increasing productivity and safety in production lines of a plant is generated on the basis of experts' experience or knowledge.

First, an example of the prior art method or process of generating the optimum rules will be described herein-below with reference to FIG. 1 of the accompanying drawings. This conventional process starts with Step 131 whereupon an interview with a well-experienced or expert operator by a knowledge engineer (hereunder abbreviated as a KE). Next, the process proceeds to Step 132 whereupon (candidate) rules are generated by the KE on the basis of knowledge or know-how acquired at the interview made in Step 131. The process then enters Step 133 whereupon the thus generated rules are checked by the expert operator. If one of the rules is not acceptable for the expert operator, the process returns to Step 132 whereupon an alternative rule is generated by the KE. On the other hand, if acceptable, the process advances to Step 134 whereupon the rules are further checked by being tested on a production line of the plant. If the result of the test is unsuccessful, the process returns to Step 132 to generate an alternative rule. However, if successful, the whole process is completed.

In the above-described conventional process for eliciting rules, it is necessary for a KE to make interviews with expert operators over a long period of time in order to make up for uncertainness (that is, lack of objectivity) about the experts' experiential knowledge, that is, embody the know-how. Accordingly, the results of generating rules greatly depend upon the personal capability of a KE who interviews the expert operator. Thus, the above-described conventional process for eliciting rules is disadvantageous in that it is difficult to provide rules with objectivity. The present invention is accomplished to eliminate the above-mentioned defects of the prior art.

It is therefore an object of the present invention to provide method for generating rules for an expert system for controlling operation of production lines of a plant in a short period of time through a semi-automatic process for constructing rules without depending on a personal capability of a KE.

SUMMARY OF THE INVENTION

To accomplish this object, in accordance with a first aspect of the present invention, in an expert system for use in a plant control system, a method is provided for generating rules which comprises the steps of analyzing the relation between an operator's manipulated values of operating data and the operator's observed values of the plant operating data in accordance with Hayashi's first method of quantification (hereafter sometimes referred to as Quantification Theory I) and converting the numerical results of the analysis into rules for controlling operation of the plant converting the numerical, results of the analysis into rules for controlling operation of the plant. The details of Hayashi's first method of quantification (Quantification Theory I) are described in, for example, Dr. S. Iwatsubo's work "Elements of Quantification Methods" published by Asakura Shoten, 1987 (in Japanese) an English translation of which is provided as Appendix A hereof. Further, the essential part of Hayashi's first method of quantification is explained in § 2 of his article entitled "On the Prediction of Phenomena from Qualitative Data and the Quantification of Qualitative Data from the Mathematico-Statistical Point of View" (Annals of the Institute of Statistical Mathematics, vol. 3, pp. 69–98, 1952, a copy of which is provided as Appendix B hereof), as a quantification method of qualitative data in case where an "outside criterion" is represented by a numerical value.

Further, in accordance with a second aspect of the present invention, there is provided a method for generating rules which comprises steps of analyzing the relation between the operator's manipulated values of the operating data and the operator's controlled values of the operating data by Hayashi's second method of quantification (hereunder sometimes referred to simply as Quantification Theory II) of the operating data offered by the operator in a plant and converting the numerical results of the analysis into rules for controlling operation of the plant the plant. The details of Hayashi's second method of quantification (Quantification Theory II) are also described in the aforesaid Dr. S. Iwatsubo's work. Further, Quantification Theory II is similar to Quantification Theory I but different from the latter in that in the former, an "outside criterion" is represented by a symbol indicating a class or group to which it belongs as shown in a table on page 82 in § 3 thereof.

Thereby, rules having objectivity can be easily generated by eliciting from actual operating data manipulated by an operator in a plant and accordingly the burden of a KE can be considerably lightened.

Furthermore, in accordance with a third aspect of the present invention, there is provided another method for generating rules for an expert system for controlling operation of a plant which is operative to execute a plurality of operating procedures in sequence. This method of the present invention comprises steps of collecting operator's operating data each obtained in response to the execution of individual procedure, putting the operator's operating data into various "categories", analyzing the operator's operating data by Quantification Theory I which quantifies operational conditions other than those relating to human factors, checking the results of the analysis, determining candidate rules for optimum procedures in the plant and testing the candidate rules on a plant line to finally determine passing rules as optimum ones.

In particular, when the plant is operated in line with standard operating procedures offered by a skilled operator, the unit resultant data is collected every operating procedure. The unit resultant data is then analyzed and further, the results of the analysis are comprehensively estimated to form candidate controlling rules having objectivity for the plant. Thereafter, operations are effected in accordance with the candidate controlling rules on the practical plant line to determine optimum rules. In this manner, in accordance with this method, operating rules (consequently, controlling rules for an expert system) are elicited from operating data, that is to say, from facts established in the plant. Thereby, the extent of the dependence of the results of generating rules on personal capability of the KE can be considerably reduced. Moreover, rules having objectivity can be semi-automatically generated in a short period of time.

BRIEF DESCRIPTION OF THE DRAWINGS

The above and other advantages of the present invention will become more apparent in the following description and the accompanying drawings in which like reference numerals refer to like parts and in which:

FIG. 5 is a diagram showing an example of a rule generated by the process of FIG. 2;

FIG. 8 is a diagram showing an example of a rule generated by the process of FIG. 6;

FIG. 11 is a diagram showing operating data;

FIG. 12 is a diagram showing categorized values;

FIG. 13 is a diagram showing "scores" of "categories";

FIG. 14 is a diagram for illustrating the results of analyzing the operating data of FIG. 11.

DESCRIPTION OF THE PREFERRED EMBODIMENTS

Hereinafter, preferred embodiments of the present invention will be described in detail with reference to the accompanying drawings.

Figure 1:
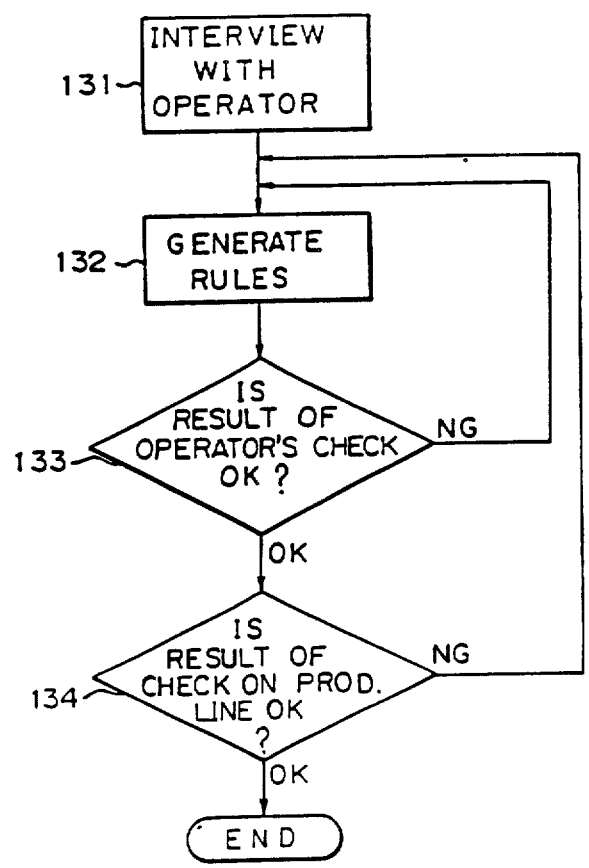
FIG. 1 is a flow chart illustrating the prior art procedure for generating rules for an expert system for use in a plant control system.
Figure 2:
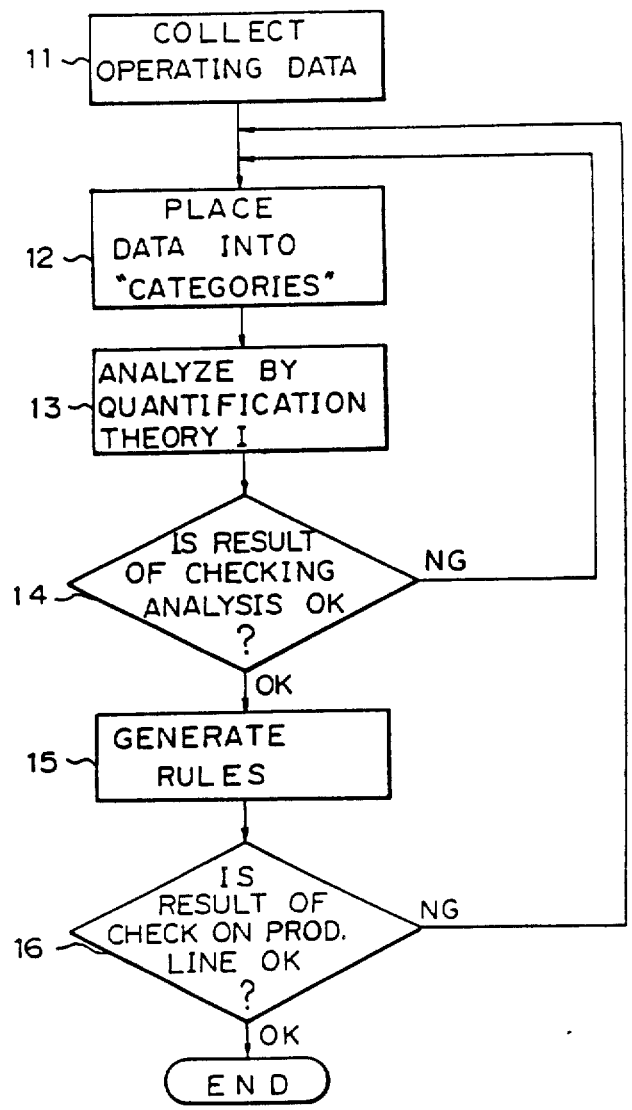
FIG. 2 is a flow chart illustrating the method or process for generating rules for an expert system embodying the present invention.
Figure 4:
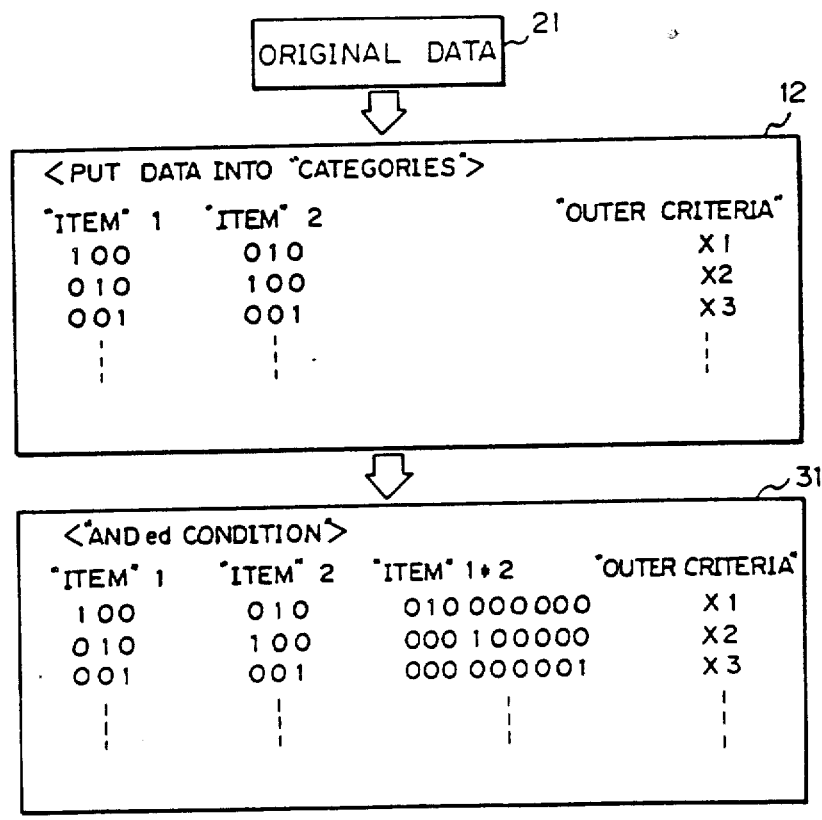
FIG. 4 is a diagram for illustrating an example of data processing in an expert system in case the process of FIG. 2 is applied to the processing.

Referring now to FIG. 2, there is shown a flow chart illustrating the process for generating rules for an expert system which is a first embodiment of the present invention. This process is commenced with firstly acquiring operating data in Step 11 whereupon samples are further acquired from the operating data. Next, the process proceeds to Step 12, whereupon the operating data are placed into several "categories". In this step, boundary values are determined to put the operating data on each "item" into the "categories". (The relation between an "item" and a "category" is described in the above-mentioned Hayashi's article and further, it is to be noted that the term "category" corresponds to "sub-category" described therein.) The synergistic effects among "items" cannot be represented by the general method of quantification, that is, Hayashi's first method of quantification (Quantification Theory I) but, according to the present invention, can be represented by making use of "AND condition" of each pair of "items" as exemplified in block 31 of FIG. 4. Namely, this figure shows how the data are worked or processed in the process of the present invention in a case the number of "items" is 2 and that of "categories" belong to each item is 3 by way of example. Further, it is shown in block 31 of FIG. 4 how an "item" 1*2 representing the synergistic effects between an "item" 1 and an "item" 2 can be obtained in accordance with the "AND condition".

Figure 3:
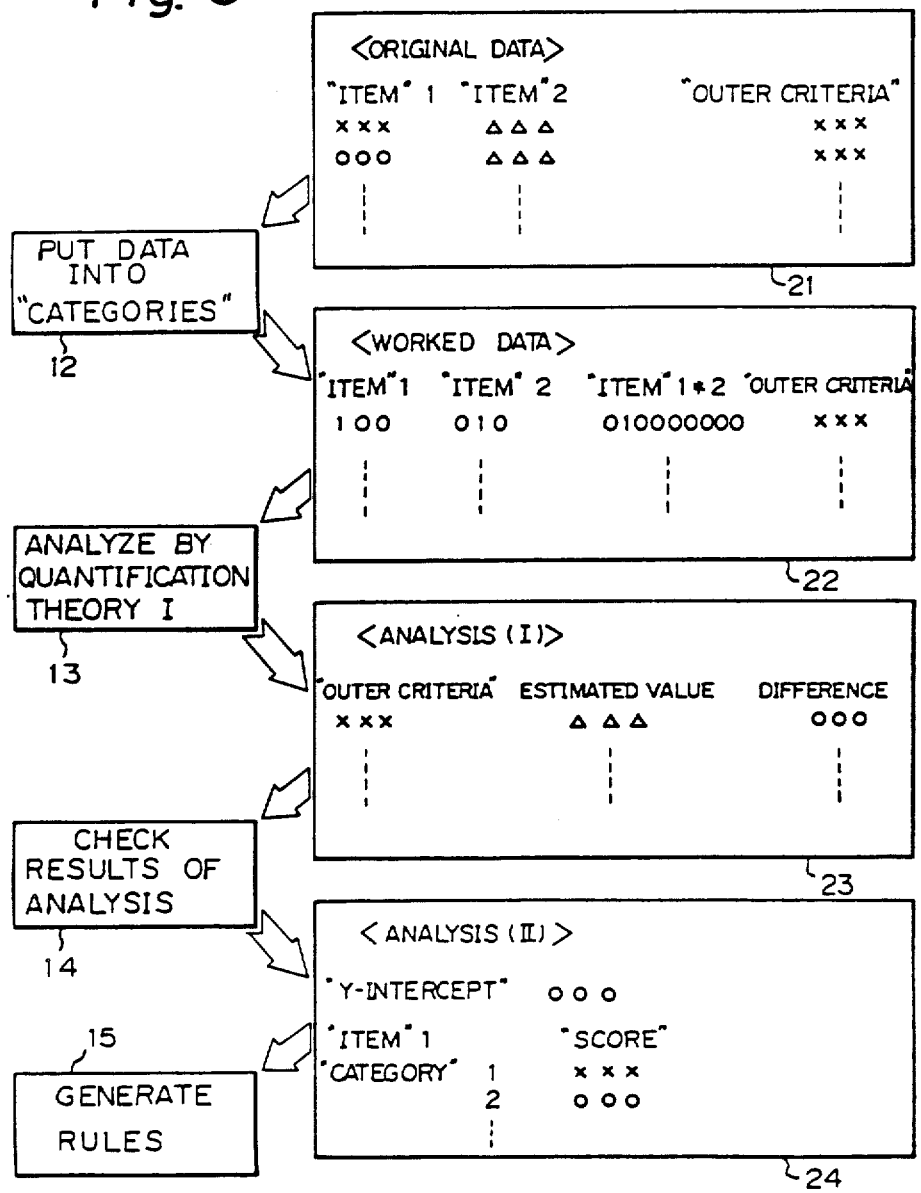
FIG. 3 is a diagram for illustrating an example of application of Quantification Theory I to the process of FIG. 2.

Hereinafter, an example of practical processing of data will be described by referring now to FIG. 3. First, worked or processed data are produced from original data 21, which is categorical data, in the sample in a manner as shown in this figure. Namely, such categorical data are firstly reduced to or changed into numeric codes. For example, when data on an "item" 1 in the original data 21 has is present only in a "category" K thereof, the worked data 22 is produced such that value of the K-th "category" of the "item" 1 is "1" and those of the others are "0". In this case, "outer criteria" are not worked. Each "item" in the worked data 22 is ANDed and as a result, "ANDed condition" of the data is obtained as shown in block 31. In Step 13, analysis is made by Quantification Theory I on the basis of the "ANDed condition" shown in block 31 and thus, "Analysis (I)" 23 is obtained. Further, the process enters Step 14, whereupon the result of the analysis, that is, "Analysis (I)" is checked and as a result, "Analysis (II)" 24 is obtained. "Analysis (I)" 23 shows "outer criteria" of each "item", estimated value of the "outer criteria" and the difference between them. "Analysis (II)" 24 contains "Y-intercepts" and calculated value of "scores" of each "category" in each "item". If the difference between the "outer criteria" and their estimated values is larger than a predetermined error on each sample in "Analysis (I)" 23, the process returns to Step 12 and the procedure of placing original data in "categories" is conducted again. If the difference between the "outer criteria" and their estimated value is smaller than the predetermined error on each sample, a rule is generated on the basis of "Analysis (II)" 24 in Step 15. By way of example, a production rule, that is a rule of an "IF . . . THEN type", is shown in FIG. 5. The rule thus generated is then checked by being tested on a production line in the Step 16 shown in FIG. 2. If the result of the test is not successful, the process returns to Step 12 where the procedure of placing data into categories is conducted again. If successful, the process is completed.

Figure 6:
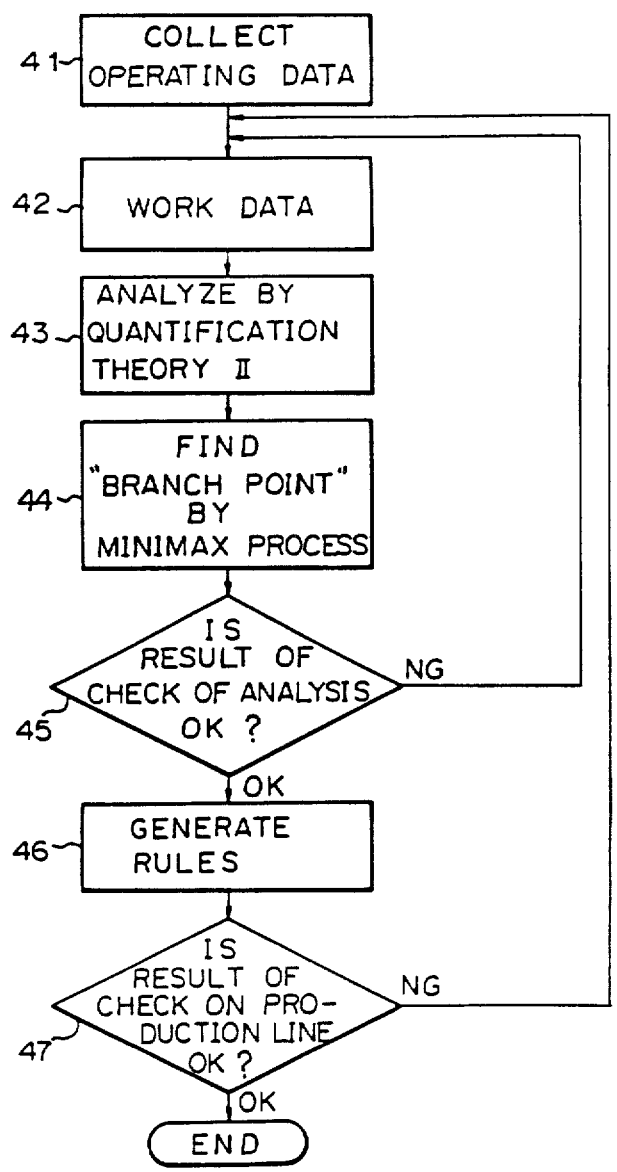
FIG. 6 is a flow chart for illustrating another process for generating rules for an expert system for use in a plant control system embodying the present invention.

FIG. 6 is a flow chart illustrating a second embodiment of the present invention, that is, another process of the present invention for generating rules for an expert system for use in controlling a plant. Referring to FIG. 6, this process starts with Step 41 which selects samples from operating data. Further, this process enters to Step 42, whereupon the data are processed or worked firstly by being put into "categories" or "groups" on each "item". Analysis is next made by Quantification Theory II in Step 43. Thereafter, in Step 44, "branch points" are founded by the minimax process. Furthermore, after Step 44, the process advances to Step 45 which checks the result of the analysis. Rules are then generated from the result of the analysis in Step 46. The process next enters Step 47 which practically checks the rules thus generated by testing them on a production line of the plant.

Figure 7:
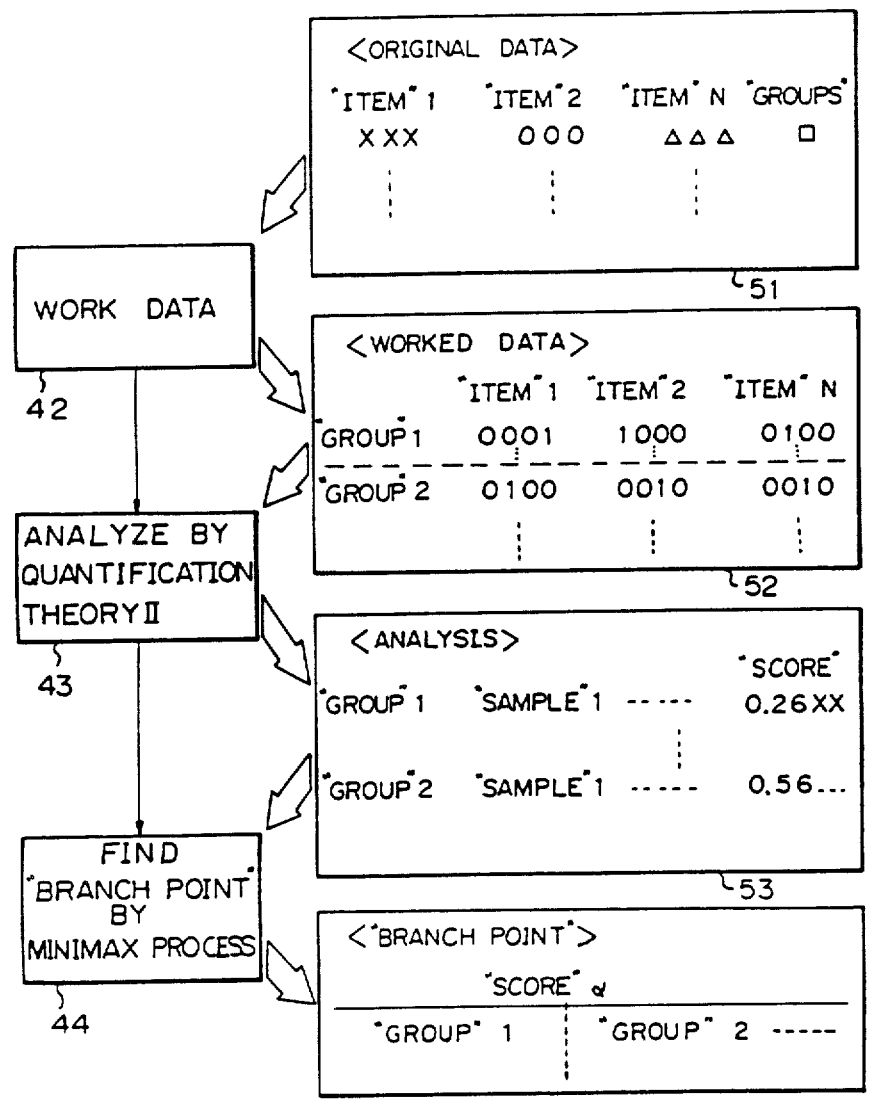
FIG. 7 is a diagram for illustrating an example of application of Quantification Theory II to the process of FIG. 6.

Moreover, FIG. 7 shows an example of application of Quantification Theory II to the process of FIG. 6. Further, FIG. 8 shows an example of a rule generated by the process of FIG. 6.

Hereinafter, the process of FIG. 6 will be described with reference to FIGS. 6 through 8. Referring to FIG. 6, first, operating data are collected and further a sample is selected from the operating data in Step 41. Next, the process advances to Step 42, whereupon "boundary values" for putting the sampled data into several "categories" are determined on each "item". The sample data are divided into several "groups" by type of the operation executed by the operator of the plant. As shown in FIG. 7, original data 51 is worked or processed into data 52. Next, in Step 43, data 52 is analyzed by Quantification Theory II. Taking the "score" of samples in Analysis 43 into consideration, "branch points" which serve as reference for grouping of the sampled data are found by the minimax process in Step 44. The process further enters Step 45 which checks results of the analysis. If the results are not acceptable, the process returns to Step 42, whereupon the original data are worked again. On the other hand, if acceptable, the process proceeds to Step 46 which generates rules from the results of the analysis. By way of example, a production rule, that is a rule of "IF . . . THEN type", is shown in FIG. 8. Next, the process enters Step 47 which checks the rule thus generated by testing them on a production line. If the result of the test is not successful, the process returns to Step 42, whereupon the original data is worked again. If successful, this process is completed.

Next, a still another embodiment of the present invention will be described hereinafter.

Figure 9:
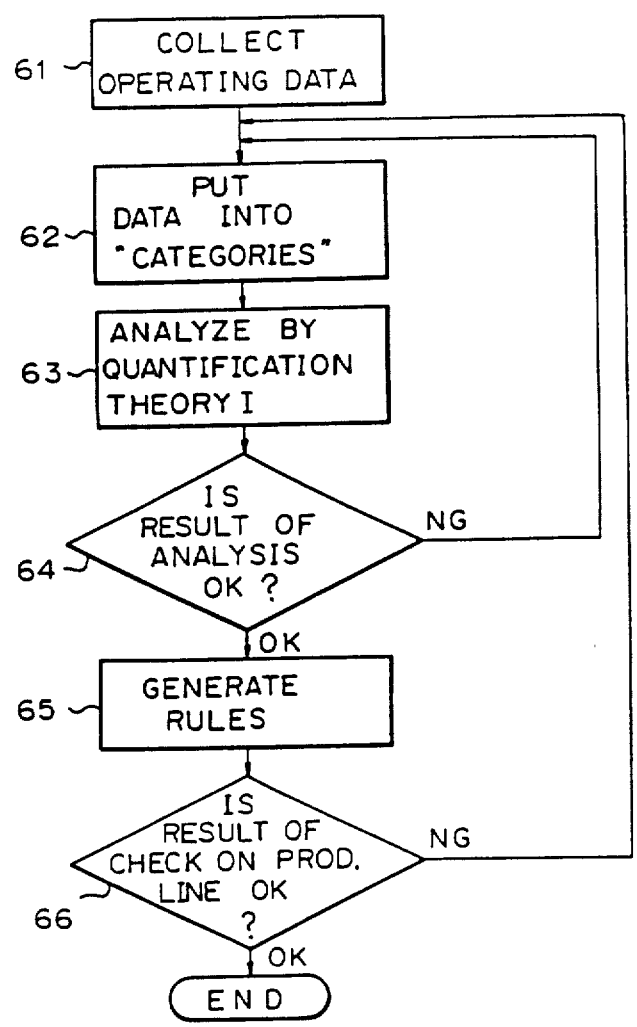
FIG. 9 is a flow chart illustrating still another process for generating rules for an expert system for use in controlling operation of a plant embodying the present invention.

Referring to FIG. 9, this process enters Step 61 which selects a sample from operating data. Further, the process advances to Step 62, whereupon the sampled data are placed into several "categories" on each "item" thereof. Thereafter, in Step 63, analysis is made by Quantification Theory I which quantifies operational conditions other than those relating to human factors. Next, the process enters Step 64 which checks the result of the analysis. Then, in Step 65, rules are generated from the result of the analysis. The process further executes Step 66 which checks the rule thus generated by testing them on a practical line in Step 66.

Figure 10:
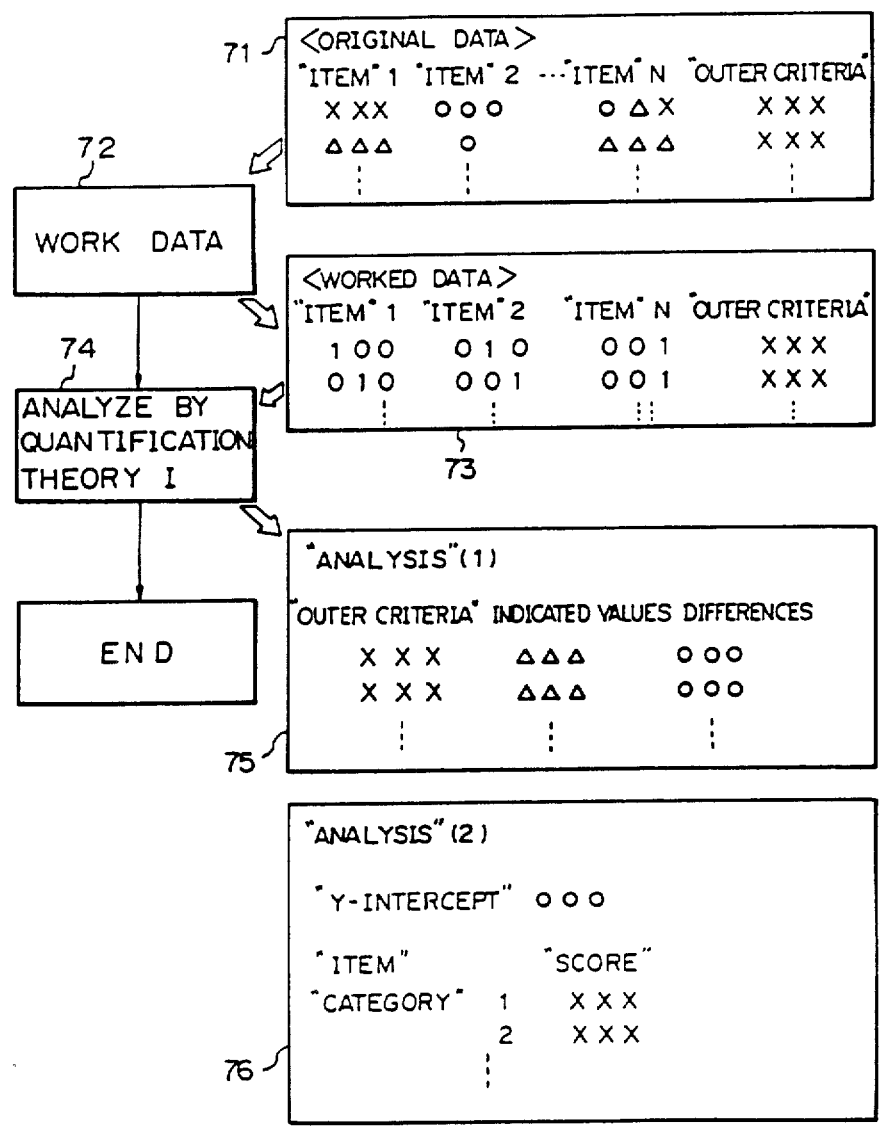
FIG. 10 is a flow chart illustrating in detail the operation of Quantification Theory I of FIG. 9.

FIG. 10 gives a detailed explanation of analysis effected in Step 63 by using Quantification Theory I. Original data is generally shown in block 71. Further, the original data 71 is worked or processed in Step 72 into data which are generally shown in block 73. Next, in Step 74, the worked data 73 are analyzed by operational conditions which vary objectively. Furthermore, blocks 75 and 76 show the results of the analysis.

The whole process of the present embodiment will be summarized hereinbelow. Before starting this process, the operating line is operated and is set every operation such that the sampling of operating data is ready. First, this process enters Step 61, whereupon a unit resultant sample is selected from the operating data. Next, in categorization Step 62, "boundary values" are determined for each "item" to putting the sampled data into "categories" 1 to n. The sample is then analyzed by Quantification Theory I as in Step 63.

Further, the details of this analysis according to the present invention will be described hereinafter. First, as above-mentioned, the process enters Step 72 whereupon the original sample data 71 is worked, that is, changed into numeric codes. For instance, when the data on an "item" i ($1 \leq i \leq n$) in the sample data 71 are present or contained only in a "category" K thereof, the original data 71 is worked onto data 73 wherein value of the K-th "category" belonging to the "item" i is "1" and those of the others belonging to the same item are "0". In this case, "outer criteria" are not worked. The data 73 thus obtained is then analyzed by Quantification Theory I in Step 74 to obtain the results, that is, "Analysis" 75 and 76. "Analysis" 75 shows "outer criteria", estimated value of the "outer criteria" and the difference between them. "Analysis" 76 shows "Y-intercepts" and calculated value of "scores" of "categories" 1 to n in the "items" 1 to n. The process then returns to Step 64 in the flow chart of FIG. 9 whereupon the results of the analyses are checked. If the difference between the "outer criteria" and their estimated value on each sample in "Analysis" 75 is larger than the desired error, the process returns to Step 62 whereupon the procedure of placing the data into "categories" is conducted again. If it is smaller than the desired error, the process proceeds to Step 65 whereupon rules are generated from the analysis. Further, the rules are generated as a production rule, namely, a rule of "IF . . . THEN type" as described below:

"If data on 'Item' 1 belongs to 'Category' $K_1$; data on 'Item' 2 belongs to 'Category' $K_2$; and

.
.
.

data on 'Item' N belongs to 'Category' $K_n$;
output = 'Y-intercept'
+ 'score' of 'Category' $K_1$ in 'Item' 1
+ 'score' of 'Category' $K_2$ in 'Item' 2

.
.
.

+ 'score' of 'Category' $K_n$ in 'Item' N."

The process then proceeds to Step 66 whereupon the rule thus generated is tested on a production line and checked. If the result of the test is not successful, the process again returns to Step 62 whereupon the procedure of putting the data into "categories" is again performed. If successful, the process is completed.

An example of the process for generating rules by using practical test data (operating data) is shown in FIGS. 11 through 14. First, FIG. 11 shows test data. Further, FIG. 12 shows categorized test data. Furthermore, FIG. 13 shows "scores" of "categories". FIG. 14 shows measured values and theoretically calculated values. A rule is generated from the example shown in FIGS. 11 through 14 as follows:

"IF    data on 'Item' a belongs to 'Category' $-1$;
       data on 'Item' b belongs to 'Category' $-1$; and
       data on 'Item' c belongs to 'Category' $-1$;
THEN   Give output of +0.13,
IF     data on 'Item' a belongs to 'Category' $-1$;
       data on 'Item' b belongs to 'Category' $-1$; and
       data on 'Item' c belongs to 'Category' $-2$;
THEN   Give output of +0.11 (0.13 − 0.02), -continued

```
IF    data on 'Item' a belongs to 'Category' −3;
      data on 'Item' b belongs to 'Category' −3; and
      data on 'Item' c belongs to 'Category' −3;
THEN  Give output of −0.51."
```

Thus, a general rule can be elicited from operating data.

While the invention has been described in detail and with reference to specific embodiments thereof, it will be apparent to one skilled in the art that various changes and modifications can be made therein without operating from the spirit and scope thereof.

APPENDIX A

Literature A: p 32 through 36

2.3 Method of Adapting Mathematical Quantification Theory and a Variety Thereof—Classification of Established Theories This is to sum-up the hard results of established mathematical quantification theories from a soft viewpoint in an attempt to facilitate the utilization thereof. Generally, there is little which may be solved by way of a single method of mathematical quantification in a phenomenon analysis, and it is essential to apply a multiplicity of methods with different angled points of analyses, that is an integral operation, this being important in practice, and in consideration of which aspect, there is a practical significance in this summing-up review. However, the following is a table which is intended to merely rearrange the established methods for reference, but not to fill existing gaps in the establishment of methods. Please review the table accordingly. The (soft and hard) methods of mathematical quantification theory are not to be directed merely to the rearrangement of investigation/experimental projects or to analytical reviews, but should also be adapted extensively and positively to seemingly intangible processes such as the general planning of an investigation or questionnaire preparations, for the purposes of objective integration of a variety of ideas to the rational and complete finishing of such tangible results of investigation and experiments. This is to be done in the first place, yet is to be done with the ultimate matters in mind.

Shown is the classification arranged from the soft viewpoint of the hard results in Tables 2.1 and 2.2. Firstly, it begins with the basic classification: "the case with the external criterion" and "the case without the external criterion". This is a fundamental for mathematical quantification theory. "The external criterion" is something of what is known per se to have propriety. Prediction may be included in this category. The term "without the external criterion" is an indication of "struggling" in an attempt to grasp certain information from a mass of data because there is no such thing that is known per se has propriety or there is no such thing that is to be projected. Processes for putting the data in order to obtain rules are formulated into the mathematical quantification theory. This is not to specify anything decisive, but has its significance in the offering of a useful clue allowing the procedure towards a hypothesis to follow. That is to say, an explanation by way of pictures-graphic representation for the purpose of grasping certain information and its pattern recognition. This may be taken to specify the angle of views and the manner of such an explanation by pictures, graphic representation, and by way of pattern recognition. The usefulness of this method may only be made certain through the practice and review of the following corroborative process to be done on the basis of an attained hypothesis. It may only be made objective not by "what is useful", but by "what has been proved to be useful".

While a detailed explanation is avoided for Tables 2.1 and 2.2, the writer believes that the reader may appreciate the general target and content thereof, if he carefully reviews these tables. It should be added that when there exists a certain external criterion, in a data analysis, such external criteria is compared with a group of several factors, but in the present method, only the group of factors are known. From the group of factors, required information which constitutes the external criterion would be estimated or predicted. In practice, it is the case that as the external criterion is not known, the object is to estimate and predict this from several factors. This process of estimation and prediction is obtained by the method of the case with the external criterion using the data in which the known external criterion and factors correspond to each other. On the other hand, in the case where there is no external criterion, only data exists, and it is the practice that such a constructional concept is depicted by using a model which is useful for obtaining certain information from such data. The manner of obtaining information is varied and is to be devised in any manner which may suit our object. When based upon the model for depicting a constructional concept, it should have a full expression of the aspect of data at hand. This method of use is to extract what is essential and latent in data from the manipulation of such data at hand. That is, while there is no desired information available from that data per se, it is the case that useful information may exist where a certain construction which suits such data may be found (depicted by way of modeling).

TABLE 2.1

Case with External Criterion

| | | | | |
|---|---|---|---|---|
| Case with external criterion | When in quantity | When in 1-dimensional quantity (Correlation coefficient may become efficiency of forecasting) | | → Called Quantification Theory 1 (may be of extension of regressive analysis) |
| | | When it is a vector (Object may be attained with parallel disposition in case of 1-dimensional quantity) | Quantification based on correlation ratio | → Called Quantification Theory 2 (may be of extension of discriminant function |
| | When in classification | When with two for number of classification | When calssification is by way of absolute criterion with quantification by way of 1-dimension) | Quantification based on hitting rate |
| | | | When classification is by way of comparative judgement | When a paired comparison, it will be Guttman's quantification |
| | | When with three or more for number of classification | When classification is by way of absolute criterion | When classification is of 1-dimensional phase (quantification based on correlation ratio, possible by way of 1-dimensional quantification) |
| | | | | When classification is of multi-dimensional phase — Extension of those above (attributable to extension of quantification based on correlation ratio; possible by way of multi-dimensional quantification) |
| | | | When classification is by way of comparison test | Those w/increased stages of judgement by way of paired comparison |
| | | | | Those based on concurrent judgement of many items — Taking factor group in each dimension (w/several factor group corresponding to each dimension) to use discriminatory scale based on generic variance → Called Quantification Theory 2 (may become extension of discriminant function) |

TABLE 2.2

| | | Case without External Criterion |
|---|---|---|
| Case without external criterion | Those based on reactive pattern of factors | Those to be determined for relationship of the two (Having a close relation with $\chi^2$ test. Method of maximizing correlation ratio/correlation coefficient) |
| | | Those to be determined for relationship of reactive patterns with respect to three or more items. → Called Quantification Theory 3 Quantification of similar matters: pattern classification. (Acting in unison with method of analyzing factors when all reactions given in quantity) |
| | | → Called Quantification Theory 4 |
| | When with relationship expression in quantity | When it is of a relation between the two: $e_{ij}$ Type Quantification (When a relation is given by way of correlation co-efficient, component analysis/factor analysis may be applied, which is adapted when $e_{ij}$ showing relationship of i and j may be of any scale of affinity or of non-affinity (which may be ambiguous). Required to determine the construction when with the moderate restrictions in the expression of relationship - quantification of sociometry) |
| | | When it is of a relation between the three or more: K-L Type Quantification (When $e_{ij}$ represents non-affinity, a problem to determine a certain space, e.g., a minimum dimension S which is conceivable as a distance in Euclidean space, and of a spatial disposition thereof wherein i,j = 1, 2, ..., N) |
| | Those based on expression of relation between elements | Extension of $e_{ij}$ type quantification above $e_{ijk}$ quantification Adaptable when a relation originated firstly between the three: i, j, k. Same when there are more than three. When relation of i and j is determined by way of k → Torgerson's multi-dimensional analysis |
| | When with relationship expression not in quantity | When with moderate restrictions on $e_{ij}$ which represents affinity and non-affinity and when given as only information a rank order or ordered grouping index { Shepard Method / Kruskal Method / SSA Method (Smallest Space Analysis-by Guttman) / MDA Method (Minimim Dimension Analysis-by Hayashi) } |
| | | When with judgement table of a paired comparison table (A problem to find a minimum dimensional space and each element's coordinates to eventually determine spatial disposition of each |

APPENDIX B

Literature B

1. What is Mathematical Quantification Theory?

Construction of the Chapter

Firstly, the purpose of this paper is to present the characteristic aspects of qualitative data and the meaning of their mathematical quantification by way of reviews of what is called the multivariate data. As a preview of the outline of the mathematical quantification theory would be helpful in the understanding of the statement in Chapter 2 et seq., this chapter is to briefly introduce the object and the characteristic aspects of each of a variety of such mathematical quantification theories. Lastly, the purpose is also to refer to the correlation coefficient and correlation ratio that serve a significant role as the criterion of mathematical quantification.

1.1 Multivariate Data

Among the readers, there should be some people who once had the experience of studying Hooke's law in their school science class. In this connection, when measuring how long a coil spring will extend in accordance with many different weights, it is observed that the extent of extension (e.g., measured in millimeters) of the spring may be seen to be generally proportional to the magnitude of a weight (e.g., measured in grams) within a certain range of weights to be used. When pairs of measuring points are taken on a two-dimensional surface, plotting the values of the weight (g) of the weight on the ordinate, and the values of extension (mm) thereof on the abscissa, it may be observed that such measuring points are aligned along a straight line from the origin 0 to the point A (called Elastic limit).

In the example above, when taking ten different weights to be weighted by way of a balance, there may be obtained "a set of measured values of weight: $x(1), x(2), \ldots, x(10)$" and "a set of measured values of spring extension: $y(1), y(2), \ldots, y(10)$" corresponding thereto. Then, let us symbolize them as $X = \{x(i) | i = 1, \ldots, 10\}$ and $Y = \{y(i) | i = 1, \ldots, 10\}$. Then, in these equations, X and Y are called a variate. Also, let us call "poise' weight" and "spring extension" characters, which represent a current concrete content of a variate. When there is no possibility of misconception, it is the practice that the former is called a variate "weight" and the latter a variate "extension", respectively. Like "weight" and "extension" as in this case, a set of measured values which may correspond one to another is called a bivariate data.

In reality, the fact that "weight" and "extension" may be expressed in quantity has significance. This is because inasmuch as they may be expressed in quantity, a pair of measured values can be located in sequence on a two-dimensional surface, thus making it appreciable at a glance that they are aligned in a linear fashion. Then, let us call a quantitative variate such variates which are all expressible in quantity as "weight" and "extension". In the example of Hooke's law, the state wherein the weight is 0 g and the extension is 0 mm may correspond to the origin 0, but the state with negative weight and negative extension does not exist in actuality. This measured value having the origin is called one in a specific scale. In contrast, a measured value which may be expressed in quantity yet allowing a negative state and having a significance with a difference or with a range like "temperature (degrees in centigrade or in Fahrenheit)" may be called one in a range scale. (However, taking "the absolute temperature (°K)", it would be a measured value with the specific scale.)

Now, in the case that there are "n" variates and that when a measurement may be conducted respectively for a common set of objects, there may be obtained "n" pairs of sets of measured values, this is called n-variate data. For example, let us assume a school class wit 50 students in total and that the results of rating were given at the end of term for the courses of mathematics, science, social studies, English and the national language (each with the full mark 100 points) that all the students went through. As there are given 50 students' data which consist of five pairs of marks, this is five-variate data. With "n" of three or more, it is generally called a multivariate data. In this case of five-variant data, placing the names of students in the vertical item (or row) of Table 1.1, while placing the items of variates in the horizontal item (or column) thereof, these items may be shown in a rectangular table, as follows (wherein the character is each "course"). In this manner where data is presented by way of such a combination of two-measured values as "a set of students" and "a set of school courses" (expressed as "students" × "school course"), this is called two-way data.

TABLE 1.1

| | Five-Variate Date (50 × 5 data) | | | | |
|---|---|---|---|---|---|
| | mathematics | science | social studies | English | national language |
| student 1 | 65 | 70 | 90 | 85 | 80 |
| 2 | 70 | 80 | 65 | 80 | 75 |
| 3 | 82 | 84 | 72 | 76 | 70 |
| . | | | | | |
| . | | | | | |
| 49 | 90 | 88 | 70 | 86 | 82 |
| 50 | 82 | 66 | 100 | 90 | 88 |

In Table 1.1, the item where each of measured values of two-way data is entered is called a cell, and then, a cell which corresponds to Row $i_1$ and Column $i_2$ is called $(i_1, i_2)$. Let us express a measured value to be entered into sell $(i_1, i_2)$ as follows:

$$x(i_1, i_2), \text{ where } i_1 = 1, \ldots, 50; i_2 = 1, \ldots, 5$$

Further to the example above, let us consider the same class of 50 students and the same five school courses that there are obtained by three different school term marking results. Now, numbering these students with from 1 to 50, let us express the set of such numbers by $I_1$. Making an optional element of $I_1$ of $i_1$, $i_1$ may then take values of 1 to 50. Likewise, putting numerals starting with 1 on the school courses and the school term ends, and expressing a set of resulting numerals $I_2$, $I_3$, and their elements $i_2$, $i_3$, respectively, $i_2$ may then take values of 1 to 5, and $i_3$ may take values of 1 to 3, respectively. Let us name $I_1$, $I_2$, $I_3$ a set of elements. Taking out one numeral $i_1$, $i_2$ and $i_3$ from $I_1$, $I_2$ and $I_3$, respectively, let us express a set of three numerals $(i_1, i_2, i_3)$ as $I_1 \times I_2 \times I_3$. The elements $(i_1, i_2, i_3)$ of a set of $I_1 \times I_2 \times I_3$ are also called cells, where "a mark that an ith student obtained for an i-th course in an ith end of school term" is to be placed. These marks may be represented in the form of a cube. Such a data may be termed as three-way data, taking "3" which represents the number of a set of elements. In general, in the case where there are "n" sets of elements ($I_k$; $k = 1, \ldots, n$), and where there are entered measured values into cells of a set of $I_1 \times I_2 \times \ldots \times I_k \times \ldots \times I_n$ $(i_1, i_2, \ldots, i_k, \ldots, i_n)$, such a set of measured values are termed as an n-way data. (Do not confuse this with n-variate data. N-variate data is two-way data.) If all measured values are expressed in quantity, it is called n-way quantitative data. Also note, in the case of n-way quantitative data, that the purpose of one of the "n" set of elements is to specify the character of a measured value. That is, taking that particular set of elements, there is contained an according number of variates therein.

On the other hand, there may be a case that any set of elements cannot be of a set of variate numbers. This may, as discussed later, be such a case, for example, that certain cells are filled up with a frequency (e.g. a frequency of observations). This is specifically termed an n-fold (or multiple) table of partition.

In general, let us express measured values entered into the cells $(i_1, \ldots, i_k, \ldots, i_n)$, where $i_1 = 1, \ldots, N_1$; $\ldots$; $i_k = 1, \ldots, N_k$; $\ldots$; $i_n = 1, \ldots, N_n$, or $i_k = 1, \ldots, N_k$; $k = 1, \ldots, n$.

As a method for representing directly a current scale of data, a system is known which is adapted to express it in terms of the multiplication of the number of elements in the element set. For example, in the case of the two-way data noted above, it may be expressed as $50 \times 5$ data; in the case of three-way data, it may be expressed as $50 \times 5 \times 3$ data, and in the case of n-way data, it may be expressed as $N_1 \times N_2 \times \ldots \times N_k \times \ldots \times N_n$ data, respectively. Note that these multiplications are of the current total number of cells.

1.2 Multivariate Data Analysis Method and Qualitative Data

Now, let us refer back to the two-way data. In the case of four or more variate data, each data cannot be represented by way of Euclidean space. In this respect, there is a question as to how to approximate multivariate data by way of plotting on a one-dimensional line or on a two-dimensional surface, which is a familiar way to learn, and by observing such graphical representation, as to how to find any regularity in the dispersion of such data. This is what is called multivariate data analysis that is the statistical technique developed in the attempt to meet such demands. (Besides, there is known the term "multivariate analysis", which may include some approaches in the theoretical development for testing, estimation and distribution on the basis of the multivariate normal distribution. In this article, this approach is not handled, and consequently, the term "multivariate analysis" is not adopted to avoid possible misconception.) Also, it is to be noted that a variety of techniques of mathematical quantification handled herein are contained among the multivariate data analyses. However, as will be reviewed later, this method has its uniqueness in that it has been devised in an attempt to extract useful information from qualitative data.

In the example of Hooke's law in Section 1.1 above, the extension of a spring and the poise's weight were expressed in quantity, respectively. The more accurate a measurement. the more digits for a significant figure are made available. However, it is to be noted that there is another field of data where an accurate measurement cannot be expressed with an increase in digits for significant figure.

For instance, let us take the following example. Let us assume that there are several young women of the same generation to whom several designs of sweater are presented to be selected in accordance with their preference. Present them with a table of a rectangular shape, wherein there are the names of the women placed in the vertical items (or in the row) and types of design in the horizontal items (or in the column). Assuming that when a certain women chooses a certain type of design, she is requested to put a mark (for example, "circle, O"), a table is completed as shown in Table 1.2 wherein there are the two-way data of "woman"×"design". However, unlike the two-way data that have been reviewed thus far, there are filled either marks "O" or "space" in place of the measured values. While the mark "O" is not a numeral, should there be any regularity in the distribution of the marks "O", we may find such a pattern and then may make a judgement as to why there is such a regularity. The method referred to in this paper of mathematical quantification theory is a useful approach to multivariate data analysis which has been devised specifically for allowing the recognition and extraction of such a regularity contained in such data. It may be mentioned that before the advent of mathematical quantification theory, the extent to which multivariate data analysis could be applied was merely to quantitative data. With the advent of mathematical quantification theory, the scope of the application of multivariate data analysis has been expanded far beyond previous expectations. Particularly, the role now being played by this approach to quantitative studies in the fields of the cultural and social sciences was an unexpected one.

TABLE 1.2

Two-Way Data (Nominal Scale Data)
Showing Preference to Sweater Designs

| Woman No. | Design No. | | | | |
|---|---|---|---|---|---|
| | 1 | 2 | ... | j | ... | n |
| 1 | 0 | 0 | | | | |
| 2 | | O | | O | O | |
| 3 | | | O | | O | |
| . | | | | | | |
| . | | | | | | |
| . | | | | | | |
| i | | O | | O | | O |
| . | | O | O | | O | O |
| . | | | O | O | O | |
| m | O | O | | O | | O |

The marks "O" and "spaces" as appeared in the two-way data in Table 1.2 are mere symbols used to discriminate "preference" from "no preference", respectively, but do not refer to their quantitative magnitude, thus making it impracticable to determine how large or small they are. It is the practice to define such data as a measurement value with a nominal scale, admitting such as marks "O" and "spaces" among the measurement value. That is to say, they are the simplest possible type of data.

The data in Table 1.2 does not show anything that refers to degree of preference. Now, let us assume the women being examined are requested to use further ranks of judgement in connection with their preferences such as the mark "O" for "liking", the mark "Δ" for "neither liking nor disliking" and the mark "X" for "disliking". In this case, then, there may be anyone of the marks of "O", "Δ" and "X" in each of the cells for the two-way data of "woman"×"design" as seen in Table 1.3. While these marks "O", "Δ" and "X" are still of the nominal scale which cannot make representation in quantity, it is to be noted that they are added with certain additional information, that is, the grade of preference, unlike the mere nominal scale. In this manner, these measured values which are not expressed in quantity yet with the phase of gradation are termed as measured values with grade scale.

Between "the nominal scale and the grade scale" and "the range scale and the specific scale", there is a measured value which may be expressed as "a frequency" (the frequency of observation) as for the middle scale (for example, the monthly traffic accident number in a certain city). In this case, the measured value has such a character that it is normally a natural number having no smaller fractions than the decimal point, and that the minimum value is zero and takes no negative values. While such a measured value may be expressed in quantity, let us call it a measured value with a discrete scale, in an attempt to discriminate. (The measured values entered in the cells of the table of n-fold partition turn out to be of the discrete scale.)

TABLE 1.3

Two-Way Data (Grade Scale Data)
Showing Preference to Sweater Designs

| Woman No. | Design No. | | | | | |
|---|---|---|---|---|---|---|
| | 1 | 2 | ... | j | ... | n |
| 1 | O | O | X | Δ | Δ | X |
| 2 | Δ | O | X | O | O | X |
| 3 | Δ | Δ | O | Δ | O | Δ |
| . | . | . | . | . | . | . |
| . | . | . | . | . | . | . |
| i | Δ | O | X | O | Δ | O |
| . | . | . | . | . | . | . |
| . | Δ | O | O | X | O | O |
| . | Δ | Δ | O | O | O | Δ |
| m | O | O | X | O | X | O |

Now, in summary, the data may be arranged as in Table 1.4. In the case that the measured values which comprise variates turn out to be of the specific scale or of the range scale, such values are called quantitative variates, and a set of total measured values made available from the whole quantitative variates are called quantitative data. Also, when the measured value of a variate turns out to be of the nominal scale or of the grade scale, this variate is called a qualitative variate, and a set of total measured values made available are called qualitative data. In like manner, while it is possible in practice to define the discrete variate and the discrete data, the discrete variate or the discrete data may be handled inclusive of the qualitative variates or of the qualitative data in this discussion. Incidentally, the discrete data may be transformed seemingly to be of the specific scale by dividing the frequency number in each cell with the total frequency number (that is, the grand sum of the frequency numbers in each of the cells, which corresponds to the total number of observations). However, it is to be noted that there is a positive restriction from the specific character unlike those with the specific scale such that the summation of the measured value for the whole cells adds up to one. (So to speak, each cell is to be given as a measured value which may correspond to a current probability of appearance. Here, this may also be handled as qualitative data.) In addition, it is to be noted that there may exist a phase of data of either qualitative or quantitative nature wherein a quantitative variate and a qualitative variate merge together.

TABLE 1.4

Classification of Data

| Variate | Measured Value | Set of Measured Values |
|---|---|---|
| Quantitative variate | Specific scale / Range scale | Quantitative data |
| Discrete variate | Probability of Appearance | |
| | Discrete scale (frequency number) | Qualitative data |
| Qualitative variate | Grade scale / Nominal scale | |

1.3 Item and Category

Referring to the two-way data of Table 1.2, if all the marks "O" are replaced with "1" and if all the "spaces" with "0", there are obtained discrete data which are seemingly comprised of "1" and "0". In this case, however, the magnitudes of "1" and "0" do not have any significance, but they would merely serve to discriminate between "the liking" and "the disliking".

The two-way data in Table 1.3 may then be expressed in the manner shown in Table 1.5. That is such a manner of marking where there are given three matters of choice "liking, (O)", "neither liking nor disliking, (Δ)" and disliking, (X)", and that "1" is placed for a cell that comes true and "0" for a cell that does not come true. In this case, there is no significance in the magnitude per se of "1" and "0", either. Incidentally, there is the following restriction in this manner of notation. That is, there is necessarily a choice of "1" for the only one of three matters of choice, the remainder all turning out to be "0". In other words, there is no chance that two or more of the choice are commonly given "1". This is stated as "the matters of choice are exclusive of each other".

TABLE 1.5

Data of Item/Category Type

| | Item | | | | | | | | | | | | | | |
|---|---|---|---|---|---|---|---|---|---|---|---|---|---|---|---|
| | Design 1 | | | Design 2 | | | ... | Design j | | | ... | Design n | | |
| | Category | | | | | | | | | | | | | | |
| Woman No. | 0 | Δ | X | 0 | Δ | X | ... | 0 | Δ | X | ... | 0 | Δ | X |
| 1 | 1 | 0 | 0 | 1 | 0 | 0 | ... | 0 | 1 | 0 | ... | 0 | 0 | 1 |
| 2 | 0 | 1 | 0 | 1 | 0 | 0 | ... | 1 | 0 | 0 | ... | 0 | 0 | 1 |
| 3 | 0 | 1 | 0 | 0 | 1 | 0 | ... | 0 | 1 | 0 | ... | 0 | 1 | 0 |
| . | | | | | | | ... | | | | ... | | | |
| . | | | | | | | ... | | | | ... | | | |
| i | 0 | 1 | 0 | 1 | 0 | 0 | ... | 1 | 0 | 0 | ... | 1 | 0 | 0 |
| . | | | | | | | ... | | | | ... | | | |
| . | | | | | | | ... | | | | ... | | | |

TABLE 1.5-continued

| | Data of Item/Category Type | | | | | | | | | | | | | |
|---|---|---|---|---|---|---|---|---|---|---|---|---|---|---|
| | Item | | | | | | | | | | | | | |
| | Design 1 | | | Design 2 | | | ... | Design j | | | ... | Design n | | |
| | Category | | | | | | | | | | | | | |
| Woman No. | 0 | Δ | X | 0 | Δ | X | ... 0 | Δ | X | ... | 0 | Δ | X |
| m | 1 | 0 | 0 | 1 | 0 | 0 | ... 1 | 0 | 0 | ... | 1 | 0 | 0 |

As reviewed hereinbefore, when it is possible in practice to express the sequential orientation of the two-way data with two possible aspects of "design" and "choice" representing the degree of liking for the design", the gathering of exclusive matters of choice (in this example, "0", "Δ" and "X") is called category, and the headings wherein these matters of choice are placed (in this example, "design") are called items. In addition, data which can be arranged in the manner shown in Table 1.5 are called item/category type data. The present mathematical quantification theory shall handle this type of data frequently. Particularly, since the table for questionnaire investigation may be summarized by way of the item/category type data, the present mathematical quantification theory may be applied very often for the analysis of the results of questionnaries.

Incidentally, when the categories may be expressed for all the items by using the common symbols "0", "Δ" and "X" as shown in the example above, it can then be represented by way of three-way data.

As reviewed fully hereinbefore, note that the qualitative data can be converted into a variety of types.

1.4 Methods of Mathematical Quantification Theory

If the measured values of qualitative type can be expressed in quantity in a certain practical manner, it would be helpful for the data analysis. Because the conversion of the values into quantitative measured values introduce a relationship of magnitude, and therefore, the concept of conventional multivariate data analysis can be used.

Methods of mathematical quantification theory present such common processes as follows:

(1) establishing certain criterion (objective function) in accordance with the object of data analysis;
(2) quantifying measured values with the nominal or grade scale for making the criterion optimalized; and
(3) extracting due information by checking data which are expressed in quantity.

Referring, for instance, to the data shown in Table 1.5, let us assume that each of the matters of choice (category) of each design (item) may be quantified on the basis of such procedures as (1) and (2), above. Also, in the step of (3) above, it is feasible in practice to review:

(a) if the current relationship of magnitude in quantity to be given to the three categories which belong to the items turn out to meet the desired relationship of grade as per the category; and
(b) if there is any inclination of deviation in each item as to the quantities, by checking the deviation in quantities as given to the three categories.

Then, it will be an important question as to how to make a due criterion (objective function) for the mathematical quantification theory.

How to establish a due criterion of the quantification depends upon an object of analysis. According to the manner of establishing the criterion, there are four main methods classified as Quantification Theory 1, Quantification Theory 2, Quantification Theory 3 and Quantification Theory 4. Table 1.6 shows the practice of this classification. Details being handled in Chapter 2 et seq., this is to outline the characteristics of these techniques, as follows.

TABLE 1.6

| Classification of Mathematical Quantification Methods | | | | |
|---|---|---|---|---|
| Data Status | Type of External Criterion. | Criterion of Optimum | Main Object | Type of Quantification |
| w/Ext'l CR | Quantity | Correlative coefficient (multi. corr) maximalization | Expection | Quantification Theory 1 |
| | Classif'n | Correlation ratio maximalization | Identif'n | Quantification Theory 2 |
| w/o Ext'l CR | | Correlation coefficient maximalization | Class'n by 1-dimens'n scale | Quantification Theory 3 |
| | | Maximalization of multiply/sum of similarity and distance | Class'n in minimum dimensional space | Quantification Theory 4 |

Historically, methods of mathematical quantification theory are excellent systems of techniques, all of them have been studied and developed exclusively by HAYASHI, Chikio in Japan. This is the fruit of his extensive original studies which have been attained through actual data analyses extended over a long term of investigations from the 1940's, immediately after the World War II through to the middle of 1950's. Since then along with the development of the computers, his studies of the present methods have made great strides in both phases of theory and application.

1.4.1 Mathematical Quantification with External Criterion

Firstly, as a mathematical quantification method adaptable to a case including external criterion, there are two phases: Mathematical Quantification Theory 1 wherein the external criterion is given as the quantity, and Mathematical Quantification Theory 2 wherein the external criterion is given as the classification. (Explanation for the external criterion will be described later.)

(1) Mathematical Quantification Theory 1

Mathematical Quantification Theory 1 was originated in the process of analysis of the results of an investigation into the general reading-writing ability of the Japanese which was started from 1948 (N. B.: Hayashi's docket [1951 b]). Ninety questions (full mark: 90 points, one point for one question) prepared as a means for enabling the estimation of reading-writing ability were presented to be answered by many subjects, who were given marks to obtain the results. On the other hand, the group of subjects was classified in terms of such items and categories as the sex (two categories), the age (ten categories), the grouping of industries to which they belong (twelve categories), the school career (fourteen categories), etc. When taking only the four items noted above, whether or not it will be possible to judge what level the result of subjects' reading/writing ability tests (more practically, the marks of tests) merely from such information as, for example which category the subjects belong. Then, the quantities were given to each category on the basis of following criteria. More specifically, let us assume that a due quantity of a given category corresponding to the very item for each item was picked up for each one of the subjects to obtain totals. In order for those sums to be the nearest possible value to the then actual mark of test, the quantities were preliminarily to be given to each of the categories. As will be stated in Chapter 2, it is feasible in practice to predetermine the quantities to be given to the categories.

Like the marks in the reading/writing ability test seen in this example, what was given in advance as measured value and made available for the criterion of quantification, or in other words, the information which is the object of quantification to fully describe the deviations may be called an external criterion. Additionally, when they are all of quantity, this is termed as the case where the external criterion is given with quantity. Also, each of quantities of the external criteria is called an external criterion value.

If a group of subjects is (1) a good representative group of the whole mass (the population) to be examined (statistically, extracted from the random sampling from the population), and (2) with a very good approximation between the actual marks and the sum of quantities of the corresponding category, then it may be adopted for prediction. For example, if there is a new person who took the reading/writing ability test, it would be possible to presume marks that would be attained by this person only by checking to which category of each item this person would belong, and not through the actual testing.

(2) Mathematical Quantification Theory 2

Now, reference is made to Mathematical Quantification Theory 2. This technique was designed with the aim of predicting which prisoners would be released on parole from a prison (N. B.: Hayashi's docket [1951 a]). This technique was the first concept that had been devised as a mathematical quantification.

When a prisoner has passed one-third of his term of imprisonment, and when the period is long enough for the prisoner to have been reformed, and no social problem would result from his/her release, he/she would be provisionally released. Let us assume that from a tracking investigation of a group of prisoners who were released, it was possible to devise a classification as to "the group in which reinstatement was successful (called Group A)" and "the group in which people again committed crimes (called Group B)". Also, let us assume that records of those provisionally released as to their parent state (four categories), the type of crime (seven categories), the state of mind when the crime was committed (five categories), their attitudes regarding reinstatement into society (five categories), etc. in terms of items and categories, respectively. Now, giving due quantities to each of the categories as in the case of Quantification Theory 1 above, obtain individual marks by calculating the quantities of categories which may turn out to be true for each item. Taking the nearest possible values of such marks of those belonging to Group A, and so for Group B, quantities to be given to each category may be determined uniquely so that marks of those who belong to each of both Groups A and B may turn out to be different from each other.

Then, if there is a due classification as to the preliminary information such as "belonging to Group A" or "belonging to Group B", which may serve as the criterion for quantification, let us consider it as a due external criterion, and this is the case that the external criterion is given by way of classification.

Also, let us assume that the group of those released provisionally was from the random sampling of the whole mass of prisoners, and that there is an explicit difference in the marks among those belonging to Groups A and B. Then, only by checking which category of which item a new prisoner may belong to, his mark may be immediately known. Also, it is possible to judge to which group of A and B his mark is near. The result of such a prediction may be a useful reference for the judgement determining if he/she should be provisionally released.

In this manner, Mathematical Quantification Theory 1 and 2 have a practical application that makes it possible in practice to given an optimal quantity to a category, on the basis of the most reasonable possible explanation of the deviations of measured values that are given in advance (values of external criterion) by an item/category type qualitative variate. In addition, Mathematical Quantification Theory 1 is adaptable for a case where the external criterion is given by way of quantity, while Mathematical Quantification Theory 2 is adaptable for a case where the external criterion is given by way of classification. (Or else, it is adaptable as in the case that the external criterion is given by way of measured values with the nominal scale, that is, with the symbols representing to which group of A and B this may belong.)

Literature B: continued, p 24 through 27

2. Mathematical Quantification Theory 1

Construction of the Chapter

Firstly, this is to lead to a basic equation of the mathematical Quantification Theory 1 to determine a quantity to be given to a certain category (an optimal score). It cannot be solved because of a lack of ranks in this basic equation. Therefore, in the actual process of calculation in this equation, it is the practice to remove an optional category for every item. Introducing the Moore-Penrose's (phonetic) general inverse matrix which may uniquely be determined rather than the category to be removed, and by correlating them, this is to show that the optimal score may become a due space scale, and that the current difference between the optimal scores of the categories belonging to one and the same item may be determined uniquely. Next, making the multiple correlation coefficient available for knowing how good the presumption is on the base, the partial correlation may be reviewed in fair detail coefficient to estimate how much influenced specific item may exert upon an external criterion. Lastly, reference is made briefly to the problem of the amalgamation of categories.

2.1 Basic Equation of Mathematical Quantification Theory 1

By way of a simple example, let us assume that there are given data of the item/category type and certain external criteria (quantity) for each individual as shown in Table 2.1.

TABLE 2.1

Item Category Type Data with External Criteria in Quantity (1)

| Individual No. | External Criterion | Item 1 | | Item 2 | |
|---|---|---|---|---|---|
| | | Cat. 1 (11) | Cat. 2 (12) | Cat. 1 (21) | Cat. 2 (22) |
| 1 | 2 | 1 | 0 | 1 | 0 |
| 2 | 4 | 0 | 1 | 1 | 0 |
| 3 | 6 | 0 | 1 | 1 | 0 |
| 4 | 8 | 0 | 1 | 0 | 1 |

Let us introduce the following function:

$$n_1(jk) = \begin{cases} 1: & \text{when Individual } i \text{ corresponds to Category } k \text{ of Item } j \\ 0: & \text{when Individual } i \text{ does not correspond to Category } k \text{ of Item } j \end{cases}$$

(where, $k=1, \ldots, N_j; j=1, \ldots, n; i=1, \ldots, m$) where, m represents a total number of Individuals; n represents a total number of Items; $N_j$ is a total number of Categories belonging to Item j.

In the example shown in Table 2.1, $m=4$; $n=2$; $N_1=N_2=1$; $n_1(12)=0$; $n_3=1$, etc.

Let us represent the external criterion value by $y(i)=(i=1, \ldots, m)$, and the value to be given to Category k of Item j (hereinafter, referred also to as "Category jk") by $x(jk)$ ($k=1, \ldots, N_j; j=1, \ldots, n$), respectively.

In the example shown in Table 2.1, $y(1)=2$; $y(2)=4$; $y(3)=6$; $y(4)=8$; $x(11)$ is a quantity to be given to Category 11, etc.

For Mathematical Quantification Theory 1, let us make the following estimator:

$$\hat{y}(i) = c + \sum_{j=1}^{n} \sum_{k=1}^{N_j} x(jk)n_i(jk) \quad (2.1)$$

$(i = 1, \ldots, m)$ $c$: constant making each of the estimating value y(i) have an approximate value as nearest as possible to the external criterion value y(i) which was already given as data. To this end, take a mean square difference represented by $$Q = \frac{1}{m} \sum_{i=1}^{m} \{y(i) - \hat{y}(i)\}^2 \quad (2.2)$$

and take a standpoint such that the value $x(jk)$ ($k=1, \ldots, N_j; j=1, \ldots, n$) is determined so that Q may become minimum. This is termed the standpoint of estimation by least squares method. Let us name $x(jk)$ ($k=1, \ldots, N_j; j=1, \ldots, n$) which minimizes Q as optimal score of Category jk ($k=1, \ldots, N_j; j=1, \ldots, n$).

Q may be modified into a quadratic expression relating to a constant c, as follows:

$$Q = \left[ c - \left\{ \bar{y} - \sum_{j=1}^{n} \sum_{k=1}^{N_j} x(jk)\overline{n(jk)} \right\} \right]^2 + \quad (2.3)$$
$$\frac{1}{m} \sum_{i=1}^{m} \left\{ y(i) - \sum_{j}^{n} \sum_{k}^{N_j} x(jk)n_i(jk) \right\}^2 -$$
$$\left\{ \bar{y} - \sum_{j}^{n} \sum_{k}^{N_j} x(jk)\overline{n(jk)} \right\}^2$$

where, $$\overline{n(jk)} = \frac{1}{m} \sum_{i=1}^{m} n_i(jk) \ (k = 1, \ldots, N_j; j = 1, \ldots, n),$$

which is an average obtained when 1 or 0 signifying whether or not individuals may duly correspond in category "jk" is considered as a measured value.

Example in Table 2.1: $\overline{n(11)}=\frac{1}{4}$, $\overline{n(21)}=\frac{3}{4}$, etc.

"c" which makes Q minimal from the expression (2.3) should be $$c = \bar{y} - \sum_{j=1}^{n} \sum_{k=1}^{N_j} x(jk)\overline{n(jk)} \quad (2.4)$$

which makes zero the term enclosed in [] of the expression (2.3). If the expression (2.1) is substituted by the expression (2.4), the following is obtained:

$$\hat{y}(i) = \bar{y} + \sum_{j=1}^{n} \sum_{k=1}^{N_j} x(jk)(n_i(jk) - \overline{n(jk)}) \quad (2.5)$$

From this equation (2.5), the following may be attained immediately.

Property 2.1
Average $$\bar{y} = \frac{1}{m} \sum_{i=1}^{m} \hat{y}(i)$$

of estimate value $\{\hat{y}(i)|i=1, \ldots, m\}$ is equal to average ŷ of the external criterion value.

If the equation (2.2) is substituted by the equation (2.5), obtained is the following:

$$Q = \frac{1}{m} \sum_{i=1}^{m} \left[ y(i) - \bar{y} - \sum_{j=1}^{n} \sum_{k=1}^{N_j} x(jk)\{n_i(jk) - \overline{n(jk)}\} \right]^2 \quad (2.6)$$

In order to determine $x(jk)$ ($k=1, \ldots, N_j; j=1, \ldots, n$) which makes this value Q minimal, that is the optimal score, it may be considered that it may satisfy the following partial differential equation:

$$\frac{\partial Q}{\partial x(jk)} = 0 \ (k = 1, \ldots, N_j; j = 1, \ldots, n)$$

From these partial differential equations, the following simultaneous equations may be introduced immediately; that is, $$\sum_{j'=1}^{n} \sum_{k'=1}^{N_{j'}} a(jk,j'k')x(j'k') = b(jk) \quad (2.7)$$

$$(k = 1, \ldots, N_j; j = 1, \ldots, n)$$

where, $$a(jk,j'k') = \frac{1}{m} \sum_{i=1}^{m} \{n_i(jk) - \overline{n(jk)}\}\{n_i(j'k') - \overline{n(j'k')}\}$$

$$= \frac{1}{m} \sum_{i=1}^{m} n_i(jk)n_i(j'k') - \overline{n(jk)} \cdot \overline{(j'k')}$$

$$(k = 1, \ldots, N_j; j = 1, \ldots, n; k' = 1, \ldots, N_{j'}; j' = 1, \ldots, n),$$

(2.8)

(2.9)

$$b(jk) = \frac{1}{m} \sum_{i=1}^{m} \{y(i) - \bar{y}\}\{n_i(jk) - \overline{n(jk)}\}$$

$$(k = 1, \ldots, N_j; j = 1, \ldots, n)$$

a(jk, j'k') is a covariance when 1 and 0 specifying whether or not individuals may duly correspond in Categories "jk" and "j'k'" are considered as a measured value (let us call this a covariance of Categories jk and j'k') and a(jk, jk) is the current variance of Category jk. Also, b(jk) is a covariance of the external criterion and Category jk.

When $$\left( \sum_{j=1}^{n} N_j \right)$$

dimension simultaneous system of equations as expressed by the equation (2.7) may be solved, the optimal score x(jk) (k=1, ..., $N_j$; j=1, ..., n) may be obtained. Now, for making a good perspective, let us express the equation (2.7) by way of a matrix and vectors.

Assume that $$\left( \sum_{j=1}^{n} N_j \right)\text{-th}$$

order square matrix wherein the elements (jk, j'k') are of a(jk, j'k') is A. Also, let us introduce $$\left( \sum_{j=1}^{n} N_j \right)\text{-th}$$

order vertical vectors x, b as expressible by the following equations (where, $x^t$, $b^t$ expresses a transposition of x, b).

$$x^t = \left( \underbrace{x(11)x(12) \ldots x(1N_1)}_{\text{Item } 1} | \ldots | \underbrace{x(j1) \ldots x(jk) \ldots x(jN_j)}_{\text{Item } j} | \ldots | \underbrace{x(n1) \ldots x(nN_n)}_{\text{Item } n} \right)$$

$$b^t = \left( \underbrace{b(11) \ldots b(1N_1)}_{\text{Item } 1} | \ldots | \underbrace{b(j1) \ldots b(jk) \ldots b(jN_j)}_{\text{Item } j} | \ldots | \underbrace{b(n1) \ldots b(nN_n)}_{\text{Item } n} \right)$$

The equation (2.7) may be rewritten by way of matrix and vector as:

$$Ax = b \quad (2.10)$$

Now, let us call the equations (2.7) or (2.10) as the basic equation of Mathematical Quantification Theory 1.

Example of Table 2.1:

|  |  | Item 1 | | Item 2 | |  |  |  |  |  |  |  |
|---|---|---|---|---|---|---|---|---|---|---|---|---|
|  |  | Cat. 11 | Cat. 12 | Cat. 21 | Cat. 22 |  |  |  |  |  |  |  |
| Item 1 | Cat. 11 | 3/16 | −3/16 | 1/16 | −1/16 | x(11) | Cat. 11 } Item 1 | = | −3/4 | Cat. 11 } Item 1 |
| | Cat. 12 | −3/16 | 3/16 | −1/16 | 1/16 | x(12) | Cat. 12 | | 3/4 | Cat. 12 |
| Item 2 | Cat. 21 | 1/16 | −1/16 | 3/16 | −3/16 | x(21) | Cat. 21 } Item 2 | | −3/4 | Cat. 21 } Item 2 |
| | Cat. 22 | −1/16 | 1/16 | −3/16 | 3/16 | x(22) | Cat. 22 | | 3/4 | Cat. 22 |
|  |  | A | | | | x | | | b | |

A is a variance-covariance matrix between categories, and b is a vector which makes an element from a covariance between the external criterion and each category. Consequently, equation (2.10) may correspond to an equation which leads to a multiple regression equation for quantitative variances. Also, the optimal score x(jk) of Category jk may correspond to a partial regressive coefficient attained when Category jk is considered a variance. This is because Mathematical Quantification Theory 1 may sometimes be termed as categorical multiple regression analysis. (See Attachment 3 for further details of multiple regression equation, and partial regressive coefficient).

Literature B: continued, p 67 through 72

3. MATHEMATICAL QUANTIFICATION THEORY 2

Construction of the Chapter

Firstly, this is to lead to a basic equation of Mathematical Quantification Theory 2 for determining an optimal score from the criterion of maximalization of a (squared) correlation ratio. Next, like the case of Mathematical Quantification Theory 1, it is shown that the optimal score is a due space scale. Lastly, this is to introduce a discrimination space and a data space to consider from the viewpoint of distance function about the criterion of discrimination as to which group individuals may belong.

3.1 Basic Equation of Mathematical Quantification Theory 2

Now, assume that there is given data of the item/category type shown in Table 3.1. Difference from those of Mathematical Quantification Theory 1 is that there is contained information as to which group each of individuals belongs, other than the external criterion value. Such data is called the item/category type data with the external criterion given by way of classification.

TABLE 3.1

Item/Category Type Data with External Criterion Given in Classification

| Group No. | Individual No. | Item 1 Cat. 1 (11) | Item 1 Cat. 2 (12) | Item 2 Cat. 1 (21) | Item 2 Cat. 2 (22) | Item 2 Cat. 3 (23) |
|---|---|---|---|---|---|---|
| 1 | 1 | 1 | 0 | 1 | 0 | 0 |
|   | 2 | 1 | 0 | 1 | 0 | 0 |
|   | 3 | 1 | 0 | 0 | 1 | 0 |
| 2 | 1 | 1 | 0 | 0 | 1 | 0 |
|   | 2 | 0 | 1 | 0 | 1 | 0 |
| 3 | 1 | 0 | 1 | 0 | 1 | 0 |
|   | 2 | 0 | 1 | 0 | 0 | 1 |
|   | 3 | 0 | 1 | 0 | 0 | 1 |

$$n_i(v, jk) = \begin{cases} 1 & \text{Individual } i \text{ belongs to Group } v, \text{ and also corresponds to Category } k \text{ of Item } j \\ 0 & \text{Individual } i \text{ belongs to Group } v, \text{ and does not correspond to Category } k \text{ of Item } j \end{cases}$$

$(k = 1, \ldots, N_j; j = 1, \ldots, n; i = 1, \ldots, m_v; v = 1, \ldots, g)$

Here, let us introduce such functions as shown above, where $N_j$, n represent the number of categories of Item j and the total number of items, as in Mathematical Quantification Theory 1. $m_v$ is the total number of individuals belonging to group $v$, g is the total number of groups and $g \geq 2$. Furthermore, assume that $$m = \sum_{v=1}^{g} m_v$$

represents the total number of individuals.

Like in Mathematical Quantification Theory 1, the quantity to be given to Category jk is represented by $x(jk)$ $(k=1, \ldots, N_j; j=1, \ldots, n)$.

Now, taking the linear equation as follows, let us assume this equation representing the mark of an individual i belonging to Group $v$.

$$y_i(v) = \sum_{j=1}^{n} \sum_{k=1}^{N_j} x(jk) n_i(v, jk) \quad (3.1)$$

$(i = 1, \ldots, m_v; v = 1, \ldots, g)$

It is the object of the mathematical Quantification Theory 2 to give an optimal value (optimal score) to $x(jk)$ $(k=1, \ldots, N_j; j=1, \ldots, n)$ so that the marks $y_i(v)$ $(i=1, \ldots, m_v; v=1, \ldots, g)$ may take similar values to each other in the same group, while they may take different values from each other in different groups. To attain this end, it is advisable to consider a maximalization of squared correlation ratio as reviewed in Chapter 1.

Expressing the average mark in Group $v$ as $\overline{y(v)}$, $$\overline{y(v)} = \frac{1}{m_v} \sum_{i=1}^{m_v} y_i(v) = \sum_{j=1}^{n} \sum_{k=1}^{N_j} x(jk) \overline{n(v,jk)} \quad (3.2)$$

$(v = 1, \ldots, g)$ where,

-continued $$\overline{n(v, jk)} = \frac{1}{m_v} \sum_{i=1}^{m_v} n_i(v, jk).$$

Average $\hat{y}$ of the total marks is as follows:

$$\bar{y} = \frac{1}{m} \sum_{v=1}^{g} m_v \overline{y(v)} = \frac{1}{m} \sum_{v=1}^{g} \sum_{i=1}^{m_v} y_i(v) \quad (3.3)$$

$$= \sum_{j=1}^{n} \sum_{k=1}^{N_j} x(jk) \overline{n(jk)}$$

here, $$\overline{n(jk)} = \frac{1}{m} \sum_{v=1}^{g} \overline{n(v,jk)},$$

which represents an average when estimating as a measured value 1 and 0 which shows whether or not an individual may correspond as to Category jk, as in the case of Mathematical Quantification Theory 1.

Example of Table 3.1: $g=3$, $m_1=m_3=3$, $m_2=2$; $n_1(1,11)=1$, $n_3(2,22)=0$, $\overline{n(1,21)}=\frac{2}{3}$, $\overline{n(2,12)}=\frac{1}{2}$, $\overline{n(12)}=\frac{1}{2}$, etc.

Assuming that the total variance where g pieces of groups are merged together is $V_T$ and intergroup variance is $V_B$, $$V_T = \frac{1}{m} \sum_{v=1}^{g} \sum_{i=1}^{m_v} \{y_i(v) - \bar{y}\}^2 \quad (3.4)$$

$$= \sum_{j=1}^{n} \sum_{j'=1}^{n} \sum_{k=1}^{N_j} \sum_{k'=1}^{N_{j'}} x(jk)x(j'k') \times$$

$$\left[ \frac{1}{m} \sum_{v=1}^{g} \sum_{i=1}^{m_v} \{n_i(v,jk) - \overline{n(jk)}\}\{n_i(v,j'k') - \overline{n(j'k')}\} \right]$$

$$V_B = \frac{1}{m} \sum_{v=1}^{g} m_v \{\overline{y(v)} - \bar{y}\}^2 \quad (3.5)$$

$$= \sum_{j=1}^{n} \sum_{j'=1}^{n} \sum_{k=1}^{N_j} \sum_{k'=1}^{N_{j'}} x(jk)x(j'k') \times$$

$$\left[ \frac{1}{m} \sum_{v=1}^{g} m_v \{\overline{n(v,jk)} - \overline{n(jk)}\}\{\overline{n(v,j'k')} - \overline{n(j'k')}\} \right]$$

then, it is suggested $x(jk)$ $(k=1, \ldots, N_j; j=1, \ldots, n)$ is determined so that square correlation ratio $$\eta^2 = V_B/V_T \quad (3.6)$$

may be maximal.

Now, if $$a(jk,j'k') = \frac{1}{m} \sum_{v=1}^{g} \sum_{i=1}^{m_v} \{n_i(v,jk) - \overline{n(jk)}\}\{n_i(v,j'k') - \overline{n(j'k')}\} \quad (3.7)$$

$(k = 1, \ldots, N_j; j = 1, \ldots, n; k' = 1, \ldots, N_{j'}; j' = 1, \ldots, n)$ $$b(jk,j'k') = \frac{1}{m} \sum_{v=1}^{g} m_v \{\overline{n(v,jk)} - \overline{n(jk)}\}\{\overline{n(v,j'k')} - \overline{n(j'k')}\} \quad (3.8)$$

$(k = 1, \ldots, N_j; j = 1, \ldots, n; k' = 1, \ldots, N_{j'}; j' = 1, \ldots, n)$ then, $a(jk,j'k')$ is a covariance when 1 and 0 is estimated as a measured value which shows whether or not an individual may duly correspond with respect to Category jk and Category j'k', as in the case of Mathematical Quantification Theory 1. (Incidentally, a(jk,jk) represents the current variance of Category jk). Also, b(jk,j'k') represents a covariance, when 1 and 0 are estimated as a measured value to find an average within group of Category jk and an average within group of Category j'k', respectively.

Now, let us introduce a $$\left( \sum_{j=1}^{n} N_j \right)\text{-order}$$

square matrices A, B wherein elements (jk,j'k') are a(jk, j'k') and b(jk, j'k'), respectively. Let us call A as a variance/covariance matrix and B as a intergroup variance/covariance matrix.

Example of Table 3.1

$$A = \begin{array}{c|ccccc} & 11 & 12 & 21 & 22 & 23 \\ \hline 11 & 1/4 & -1/4 & 1/8 & 0 & -1/8 \\ 12 & -1/4 & 1/4 & -1/8 & 0 & 1/8 \\ 21 & 1/8 & -1/8 & 3/16 & -1/8 & -1/16 \\ 22 & 0 & 0 & -1/8 & 1/4 & -1/8 \\ 23 & -1/8 & 1/8 & -1/16 & -1/8 & 3/16 \end{array}$$

$$B = \begin{array}{c|ccccc} & 11 & 12 & 21 & 22 & 23 \\ \hline 11 & 3/16 & -3/16 & 1/8 & 0 & -1/8 \\ 12 & -3/16 & 3/16 & -1/8 & 0 & 1/8 \\ 21 & 1/8 & -1/8 & 5/48 & -1/24 & -1/16 \\ 22 & 0 & 0 & -1/24 & 1/12 & -1/24 \\ 23 & -1/8 & 1/8 & -1/16 & -1/24 & 5/48 \end{array}$$

In order to make B, prepare $$B_1 = [\overline{n(\nu,jk)} - [\overline{n(jk)}] =$$

$$\begin{array}{c|ccccc} & & & & & \\ \hline \nu=1 & 1/2 & -1/2 & 5/12 & -1/6 & -1/4 \\ \nu=2 & 0 & 0 & -1/4 & 1/2 & -1/4 \\ \nu=3 & -1/2 & 1/2 & -1/4 & -1/6 & 5/12 \end{array}$$

and $$B_2 = \text{diag.}\left[\frac{m_\nu}{m}\right] = \begin{array}{c|ccc} & 1 & 2 & 3 \\ \hline 1 & 3/8 & 0 & 0 \\ 2 & 0 & 1/4 & 0 \\ 3 & 0 & 0 & 3/8 \end{array}$$

then, $B = B_1' B_2 B_1$ may be calculated.

Incidentally, if a variance within group is $V_W$, then $$V_W = \frac{1}{m} \sum_{\nu=1}^{g} \sum_{i=1}^{m_\nu} m_\nu \{y_i(\nu) - \overline{y(\nu)}\}^2 \qquad (3.9)$$

$$= \sum_{j=1}^{n} \sum_{j'=1}^{n} \sum_{k=1}^{N_j} \sum_{k'=1}^{N_{j'}} x(jk)x(j'k') \times$$

$$\left[\frac{1}{m} \sum_{\nu=1}^{g} \sum_{i=1}^{m_\nu} \{n_i(\nu,jk) - \overline{n(\nu,jk)}\}\{n_i(\nu,j'k') - \overline{n(\nu,j'k')}\}\right]$$

$(k = 1, \ldots, N_j; j = 1, \ldots, n; k' = 1, \ldots, N_{j'}; j' = 1, \ldots, n)$ As shown by the equation (1.21) of Chapter 1, $V_T = V_B + V_W$ holds.

$$c(jk,j'k') = \frac{1}{m} \sum_{\nu=1}^{g} \sum_{i=1}^{m_\nu} \{n_i(\nu,jk) - \overline{n(\nu,jk)}\}\{n_i(\nu,j'k') - \overline{n(\nu,j'k')}\} \qquad (3.10)$$

then, let us assume that this equation is a $$\left( \sum_{j=1}^{n} N_j \right)\text{-order}$$

square matrix C having elements (jk,j'k'). Let us call C an intergroup variance covariance matrix.

Example of Table 3.1

$$C = \begin{array}{c|ccccc} & 11 & 12 & 21 & 22 & 23 \\ \hline 11 & 1/16 & -1/16 & 0 & 0 & 0 \\ 12 & -1/16 & 1/16 & 0 & 0 & 0 \\ 21 & 0 & 0 & 1/12 & -1/12 & 0 \\ 22 & 0 & 0 & -1/12 & 1/6 & -1/12 \\ 23 & 0 & 0 & 0 & -1/12 & 1/12 \end{array}$$

It will be apparent that A, B, C are symmetric matrices. In addition, the following character may hold.

Character 3.1 $\quad A = B + C \qquad (3.11)$

Or else, by way of element:

$$a(jk,j'k') = b(jk,j'k') + c(jk,j'k') \qquad (3.12)$$

$(k=1, \ldots, N_j; j=1, \ldots, n; k'=1, \ldots, N_{j'}; j'=1, \ldots, n)$

Verification $$a(jk,j'k') = \frac{1}{m} \sum_{\nu=1}^{g} \sum_{i=1}^{m_\nu} [\{n_i(\nu,jk) - \overline{n(\nu,jk)}\} + \{\overline{n(\nu,jk)} - \overline{n(jk)}\}] \times$$
$$[\{n_i(\nu,j'k') - \overline{n(\nu,j'k')}\} + \{\overline{n(\nu,j'k')} - \overline{n(j'k')}\}]$$

$$= \frac{1}{m} \sum_{\nu=1}^{g} \sum_{i=1}^{m_\nu} \{n_i(\nu,jk) - \overline{n(\nu,jk)}\}\{n_i(\nu,j'k') - \overline{n(\nu,j'k')}\} +$$

$$\frac{1}{m_\nu} \sum_{m_\nu}^{g} \{\overline{n(\nu,jk)} - \overline{n(jk)}\}\{\overline{n(\nu,j'k')} - \overline{n(j'k')}\}$$

$$= c(jk,j'k') + b(jk,j'k').$$

$$\left( \text{Note: } \sum_{\nu=1}^{g} \sum_{i=1}^{m_\nu} \{n_i(\nu,jk) - \overline{n(\nu,jk)}\}\{\overline{n(\nu,j'k')} - \overline{n(j'k')}\} = 0 \right)$$

Regarding Example of Table 3.1, make sure that $A = B + C$ may hold.

As is the case of Mathematical Quantification Theory 1, introducing $$\left( \sum_{j=1}^{n} N_j \right)\text{-order}$$

column vector:

$$x^i = \left( \underbrace{x(11) \ldots x(lN_l)}_{\text{Item } l} \mid \ldots \mid \underbrace{x(jk) \ldots x(jk) \ldots x(jN_j)}_{\text{Item } j} \mid \ldots \mid \underbrace{x(nl) \ldots x(nN_n)}_{\text{Item } n} \right)$$

then, as it may be expressed as follows:

$$V_T = x^t A x \quad (3.13)$$

$$V_B = x^t B x \quad (3.14)$$

$$V_W = x^t C x \quad (3.15)$$

Then, $\eta^2 = V_B/V_T = x^t B x / x^t A x \quad (3.16)$ may hold.

Therefore, to determine x for having $\eta^2$ maximalized, you may determine x which satisfy the following equation (see Attachment 5 for partial differentiation expressed by way of vector).

$$\frac{\partial(\eta^2)}{\partial x} = \frac{\partial}{\partial x}\left(\frac{x^t B x}{x^t A x}\right) = 0 \quad (3.17)$$

When calculating the equation (3.17), led is $$\frac{(2Bx)(x^t A x) - (x^t B x)(2Ax)}{(x^t A x)^2} = 0$$

From this, the following may be introduced.

$$Bx = \eta^2 A x$$

If $\eta^2 = \nu$, then $$Bx = \nu A x \quad (3.18)$$

This equation (3.18) is a basic equation of Mathematical Quantification Theory 2.

In the equation (3.18), $\nu$ and x are an eigenvalue and an eigenvector, respectively, which is a generic equation in connection with problem of eigenvalues. (In the normal problem of eigenvalues, A is a unit vector.)

What is claimed is:

1. A method of generating a rule for an expert system for use in controlling the operation of a plant, which comprises the steps of:
   analyzing actual operating data manipulated by an operator in a plant by means of Quantification Theory I to produce numerical results; and
   converting the numerical results of the analysis into a rule for an expert system for use in controlling the operation of said plant.

2. A method of generating a rule for an expert system for use in controlling operation of a plant, which includes the steps of:
   analyzing actual operating data manipulated by an operator in a plant by means of Quantification Theory II to produce numerical results; and
   converting the numerical results of the analysis into a rule for an expert system for use in controlling the operation of said plant.

3. A method for generating a rule for an expert system for use in controlling operation of a plant which is operative to execute a plurality of operating procedures in sequence, which includes steps of:
   collecting operator's operating data obtained in response to the execution of an individual operating procedure;
   dividing said operator's operating data into various "categories";
   analyzing said operator's operating data thus divided by Quantification Theory I which quantifies operational conditions other than those relating to human factors; and
   checking the results of the analysis theoretically and on a plant line to determine a rule for optimum operating procedures in said plant system.

4. A method for generating a rule for an expert system for use in controlling operation of a plant, which includes the steps of;
   analyzing actual operating data manipulated by an operator in a plant by means of Quantification Theory II to produce numerical results;

finding the branch points by means of the Minimax process; and converting the numerical results of the analysis into a rule for an expert system for use in controlling the operation of said plant.

5. A method as set forth in claim 1 further including the step of placing the data into categories prior to the step of analyzing actual operating data.

6. A method as set forth in claim 5 further including the steps of checking the numerical results prior to the converting step and returning to the step of placing data into categories, if the numerical results are not acceptable.

7. A method as set forth in claim 6 further including the step of checking the results of the converting step by testing them on a production line and, if the results are not acceptable, returning to the step of placing data into categories.

8. A method as set forth in claim 4 further comprising the step of placing the data into categories prior to the step of analyzing the data.

9. A method as set forth in claim 8 further including the step of checking the numerical results before the converting step and, if the numerical results are unacceptable, returning to the step of placing the data in categories.

10. A method as set forth in claim 9 further including the step of checking the results of the converting step by testing the rule on a production line and, if the rule is not acceptable, returning to the step of placing the data in categories.

11. A method as set forth in claim 2 further comprising the step of placing the data into categories prior to the step analyzing the data.

12. A method as set forth in claim 11 further including the step of checking the numerical results before the converting step and, if the numerical results are unacceptable, returning to the step of placing the data in categories.

13. A method as set forth in claim 11 further including the step of checking the results of the converting step by testing the rule on a production line and, if the rule is not acceptable, returning to the step of placing the data in categories.

* * * * *